June 16, 1959 R. BERGSMA 2,890,645
TOASTER CONTROL MECHANISM
Filed Nov. 1, 1954 4 Sheets-Sheet 1

INVENTOR.
*Rudolph Bergsma*
BY
*Harness, Dickey & Pierce*
ATTORNEYS

June 16, 1959 — R. BERGSMA — 2,890,645
TOASTER CONTROL MECHANISM
Filed Nov. 1, 1954 — 4 Sheets-Sheet 2

INVENTOR.
Rudolph Bergsma.
BY
Harness, Dickey & Pierce.
ATTORNEYS.

United States Patent Office 2,890,645
Patented June 16, 1959

2,890,645

TOASTER CONTROL MECHANISM

Rudolph Bergsma, Ann Arbor, Mich., assignor to King-Seeley Corporation, Ann Arbor, Mich., a corporation of Michigan Application November 1, 1954, Serial No. 466,173

13 Claims. (Cl. 99—329)

This invention relates to toaster control mechanisms, and particularly to mechanisms for controlling the initiation and termination of a toasting cycle as determined by the condition of the toast surface.

This invention is related to the toaster timing mechanism shown and described in copending application Serial No. 317,220 of Emil E. Sivacek, filed October 28, 1952, now Patent No. 2,750,873, issued June 19, 1956, and assigned to the assignee of the present invention. The copending application discloses an arrangement for controlling the period during which electrical heating elements in a toaster are energized. The control is effected by means of a radiation-sensitive element responsive to the surface temperature of the toast, and which produces toast slices of uniform color regardless of the type of bread used. The sensing element has a substantial temperature coefficient of resistivity and is in circuit with a responding element having a substantially constant temperature coefficient of resistivity. The expansion of the responding element as its current is changed by the change of resistance of the sensing element is utilized to effect termination of the cycle when the proper toast color is attained.

The present invention has as an object the provision of a control mechanism especially adapted for use with this basic timing circuit, but which overcomes several problems connected with this circuit and permits the circuit to be used to full advantage and efficiency.

It is another object of this invention to provide a toaster control circuit of the above nature which will compensate for variations in applied voltage, and will further compensate for current variations inherently arising from the timing circuit, thus insuring uniform results under all working conditions.

It is also an object to provide a toaster control mechanism having the above characteristics which will be positive during its control movements and will prevent re-cycling of the apparatus which might result in the immediate restarting at the end of a cycle before the next slice is inserted.

It is a further object to provide a toaster control mechanism of the above nature which is not adversely affected by changes in ambient temperature, or the heat of the toasting chamber.

It is another object to provide a control mechanism of the above character which is compact in size, inexpensive to construct and is adapted for use with different types of toasters.

Other objects, features, and advantages of the present invention will become apparent from the subsequent description, taken in conjunction with the accompanying drawings.

In the drawings:

Figure 9 is an elevational view in cross section of the toaster heating elements and vertical toaster guide wires, showing the disposition of the sensing element with respect to these parts;

Figure 1:
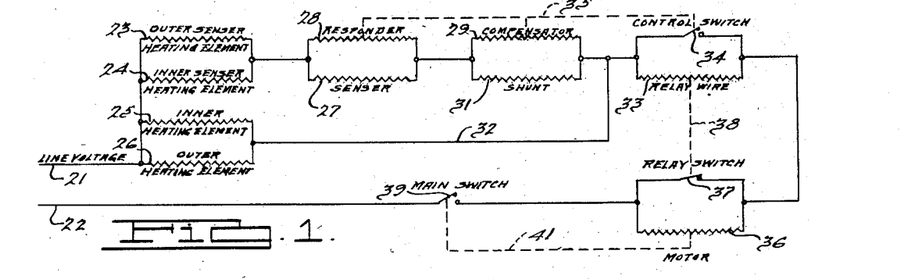
Figure 1 is an electrical circuit diagram of a toaster embodying the improved control mechanism of this invention, with mechanical connections schematically shown.

The toaster circuit shown in Figure 1 has the same basic arrangement as that shown in the above-mentioned copending application and comprises a pair of supply leads 21 and 22 and a plurality of parallel heating elements 23, 24, 25 and 26. The toaster is arranged to toast two slices of bread simultaneously, with heating elements 23 and 26 being the outer heating elements of the two chambers and elements 24 and 25 being the inner heating elements. A senser 27 and a responder 28 are connected in series with heating elements 23 and 24 and in parallel with each other. Senser 27 is positioned so as to be sensitive to the surface temperature of a bread slice being toasted. Also in series with heating elements 23 and 24 and with elements 27 and 28 are a compensator 29 and a shunt 31, these last two elements being in parallel with each other. Heating elements 25 and 26 are connected by a lead 32 to the other side of compensator 29 and shunt 31.

In series with the above-mentioned elements is a relay wire 33 which is controlled by a shunt switch 34. Switch 34 is normally open but is closed at the beginning of a toasting cycle and is opened at the termination of the cycle to cause current to flow through relay wire 33. The position of switch 34 is controlled by a mechanical connection schematically shown at 35 in Figure 1 to the responder and compensator. The construction of this connection between the responder and compensator and control switch 34 forms a portion of applicant's invention.

Also in series with the previously mentioned elements is a thermal motor 36 which serves to terminate the toasting cycle. This motor has a shunt switch 37 the position of which is controlled by a mechanical connection 38 from relay wire 33. The circuit is also provided with a main switch 39 in series with supply lead 22, and a mechanical connection schematically indicated at 41 exists between motor 36 and switch 39.

In reviewing the operation of the toaster circuit thus far described, it should be kept in mind that the functions of senser 27 and responder 28 are more completely described in the above-mentioned copending application. When the toaster is at rest before initiation of a toasting cycle, main switch 39 is open, as is control switch 34. Relay switch 37 is closed. Upon insertion of one or two slices of bread, main switch 39 is closed. The particular manner in which this switch is closed in the present embodiment is described in detail below, although it does not form part of the invention. Heating elements 23—26 are energized, and the connection 35 between the responder and compensator and control switch 34 causes immediate closing of this control switch. Relay wire 33 is thus shunted and remains de-energized, so that relay switch 37 remains closed. As the color of the bread surface becomes darker, senser 27 increases its resistance due to its temperature rise, thus causing a corresponding increase in the current passing through responder 28. The arrangement of the control mechanism, and particularly the connection between the responder 28, compensator 29, and control switch 34, is such that when the proper toast color is reached switch 34 will open. The subsequent current passing through relay wire 33 will cause this wire to expand, opening relay switch 37 through mechanical connection 38. When switch 37 is opened thermal motor 36 will be energized, causing opening of main switch 39 through connection 41 and termination of the toasting cycle.

Figure 2:
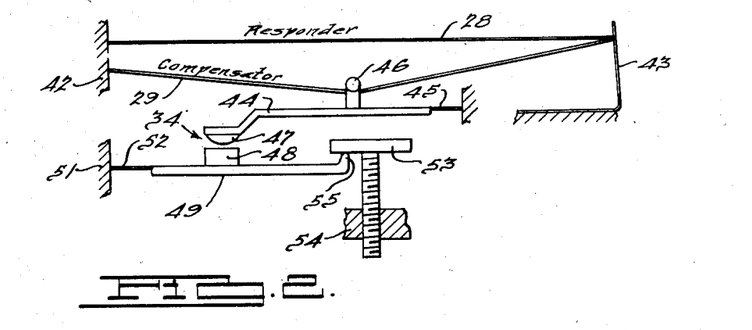
Figure 2 is a schematic view of the control mechanism before the beginning of a cycle.
Figures 3, 8:
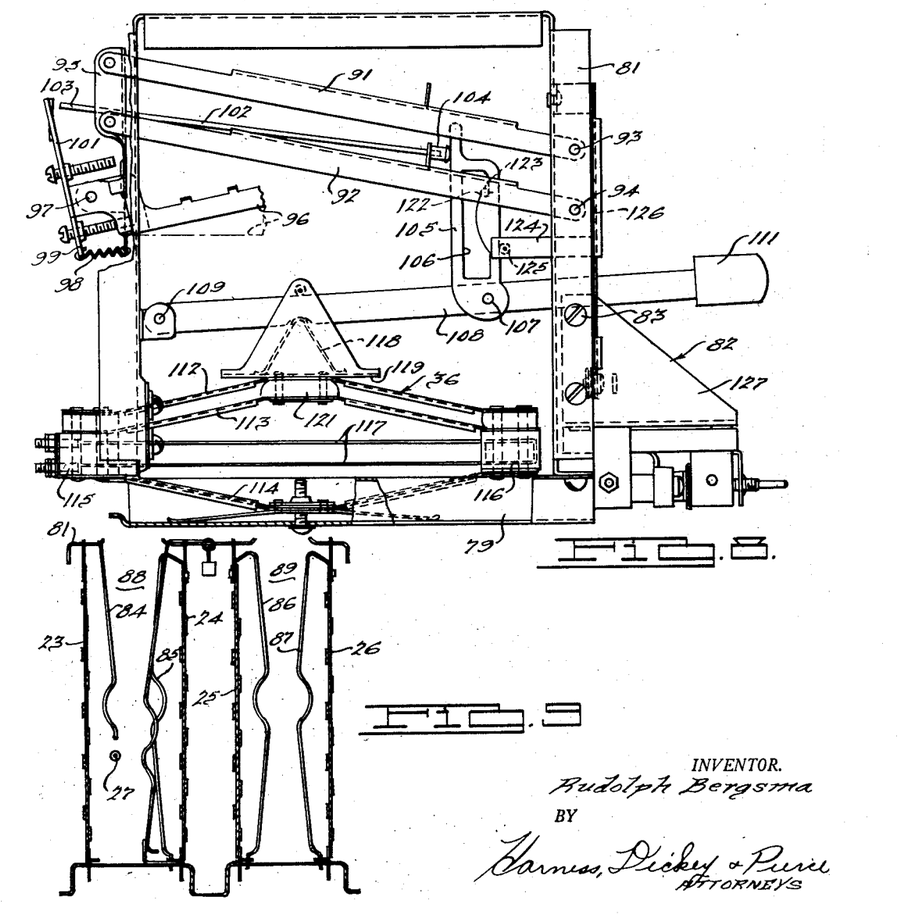
Figure 3 is a view similar to Figure 2 but showing the positions of the elements approximately 15 seconds after the initiation of the toasting cycle.
Figure 8 is a side elevational view of a toaster embodying the control mechanism of this invention, the housing and other parts of the toaster being removed, the toaster being of a type which automatically lowers and raises the toast.
Figure 3:
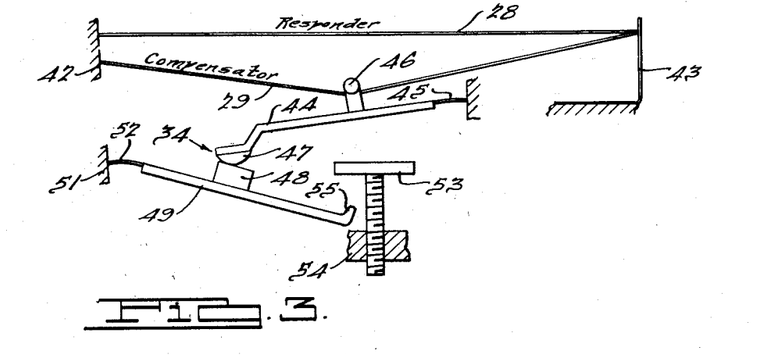
Figure 4:
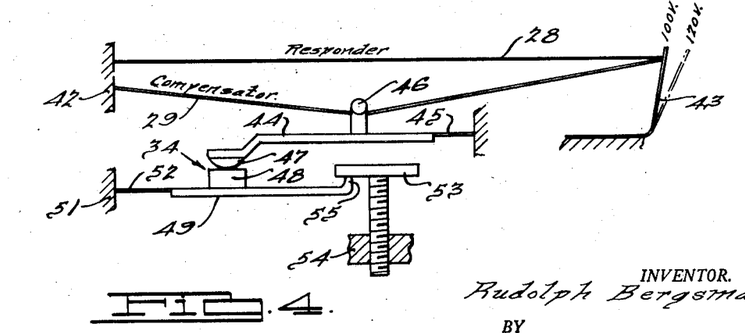
Figure 4 is a view similar to Figures 2 and 3 but showing the elements at the termination of the toasting cycle.

The construction of the control mechanism is shown schematically in Figures 2, 3 and 4. Responder 28 and compensator 29 are disposed alongside each other, being fixedly supported at adjacent ends 42 and being secured to a common support comprising a spring 43 at the other end. The physical disposition of the responder and compensator in approximately parallel relation should not confuse the reader; electrically, the responder and compensator are in series. Both elements comprise wires which are of nearly equal length, the compensator being of slightly greater length than the responder when both elements are at the same temperature. These wires are of material which has a very low temperature coefficient of resistance, for example 80% nickel and 20% chromium alloy. Spring 43 constantly urges both the responder and compensator in a direction tending to elongate both elements.

For reasons explained below, responder 28 has a greater diameter than compensator 29. For example, the responder may have a diameter of 0.020" whereas the compensator has a 0.018" diameter. The temperature coefficients of expansion of the two wires are preferably the same, but due to the difference in diameters, the responder will have a lower total resistance, for example 0.4 ohms as against 0.5 ohms for the compensator. The material from which these elements are made should have good mechanical strength at elevated temperatures. It should be kept in mind that due to the smaller wire diameter of the compensator and its higher resistance, it will respond more rapidly to changes in current than the responder despite their equal temperature coefficients of expansion.

The relative temperatures, and therefore the relative currents, in the responder and compensator will determine their relative lengths. As seen from the drawing, the amount of slack in compensator 29 will depend upon the instantaneous length of responder 28 which restricts the rightward movement of spring 43. This compensator slack is utilized to control the actuation of switch 34. This switch comprises a contact arm 44 movably mounted at 45 to a fixed portion of the toaster. Connection 45 may comprise a spring which constantly urges arm 44 away from compensator 29, or a separate spring may be used for this purpose. Arm 44 is connected to compensator 29 by a hook 46 holding the compensator taut, so that the slack in the compensator determines the position of arm 44.

Contact 47 carried by arm 44 is adapted to engage a contact 48 carried by a contact arm 49. For purposes of description, arm 44 may be termed the lead contact arm and arm 49 the following contact arm. Arm 49 is connected to a fixed portion 51 of the toaster by means of a yieldable connection 52. An adjustable stop 53 is carried by a fixed portion 54 of the toaster and is engageable by the outer end 55 of the following contact arm. Adjustment of stop 53 determines the closing position of contacts 47 and 48, this arrangement constituting the color control as described below. Connection 52 may comprise a spring which urges contact arm 49 against stop 53.

The relative positions of the parts are such that when the responder and compensator are at the same temperature, contact 47 will be held away from contact 48, as shown in Figure 2. During a toasting cycle, the lengths of the responder and compensator will each be determined by their instantaneous temperatures. The temperatures in turn are determined by the instantaneous currents of the elements and rates of radiation of heat by the elements. It is preferred that the margin of opening and closing of switch 34 be chosen at a point where the compensator temperature is somewhat above, say 20° F. above, the temperature of the responder, and the length of the compensator proportionately greater. As will appear below, this choice of dimensions for the parts results in a more positive operation and compensates for certain factors inherent in the system. It should be understood however that the basic arrangement could be varied if desired so that the point of impending opening and closing of switch 34 would occur at other relative temperatures and lengths of the responder and compensator.

The basic operation of the control mechanism may be understood from a study of Figures 2, 3 and 4. When at rest before the initiation of a cycle responder 28 and compensator 29 are at equal temperatures, and their relative lengths are such that contact 47 is held away from contact 48. The limiting position of contact 48 is determined by color control stop 53. It should be kept in mind that this setting will affect the exact temperature differential at which the contacts will be at the margin of opening and closing; the 20° figure mentioned above is a median temperature differential for medium color toast.

When the bread is inserted and main switch 39 is closed, current will flow through the responder and compensator. Since senser 27 is cold and has a relatively low resistance, the current passing through the responder will be relatively low and will normally be lower than that passing through the compensator. The compensator, having a smaller wire diameter and a higher resistance than the responder, will immediately elongate at a more rapid rate than the responder. This will cause immediate closing of switch 34 since contact arm 44 will be allowed to move downwardly as seen in Figure 3. Following contact arm 49 will be moved away from color control stop 53.

During an intermediate portion of the cycle the parts will have the positions shown in Figure 3. It will be noted that spring 43 has moved to the right in response to the rapid lengthening of compensator 29 and the slow lengthening of responder 28. The current passing through the responder will of course depend upon the temperature of senser 27, which will increase its resistance as its temperature rises.

When the responder reaches a temperature which is approximately 20° F. below the temperature of compensator 29, its length will be such that most of the slack in the compensator will have been taken up. This position is shown in Figure 4, wherein it will be seen that following contact arm 49 is abutting color control stop 53. Switch 34 is now at the margin of opening, and slight further lengthening of the responder will cause this switch to open. This will result in termination of the cycle as described above with respect to Figure 1.

When relay wire 33 is thrown into the circuit by the opening of control switch 34, the currents in the compensator and responder will drop slightly due to the added resistance in the circuit. The compensator will respond to this slight decrease in current more rapidly than the responder, thus shortening its length and drawing contact 47 even further away from contact 48. When thermal motor 36 is thrown into circuit, a similar phenomenon will occur. Upon opening of main switch 39 all the parts will return to their ambient temperatures and control switch 34 will remain open as shown in Figure 1.

ORDINARY VOLTAGE COMPENSATION

In addition to other compensating functions, described below, compensator 29 performs the function of compensating for changes in applied voltage, as described in the above-mentioned copending application. In a normal toasting cycle, increase in voltage has a tendency to make the bread toast more rapidly due to an increase in power input. A decrease in voltage will conversely cause the bread to toast slower. However, because of the greater current which is carried by responder 28 when the applied voltage is increased, the responder will reach a predetermined length sooner than it would with a lower voltage. The effect of increased current on the responder is not directly proportional to the increase in toasting speed, and when the responder reaches its predetermined length, the senser will not have reached the temperature at which it is desired to terminate the cycle. Without compensation, the cycle would thus be terminated prematurely. Conversely, with a lower line voltage the senser temperature would be higher than its predetermined value before the responder current would reach its predetermined amount, thus allowing the toasting to continue past the desired point.

The compensator acts to delay termination of the cycle when the line voltage is raised and to shorten the cycle when the line voltage is lowered. As shown in Figure 4, this is accomplished by the fact that a higher line voltage will cause lengthening of compensator 29 due to the higher current which it carries. The responder will therefore have to lengthen a greater amount in order to take up enough slack in the compensator to open switch 34. Spring 43 will be in the position shown in dot-dash lines in Figure 4 at cycle termination. This function of compensator 29 is the same as that described for the equivalent elements in the aforementioned copending application.

SELF-HEATING VOLTAGE COMPENSATION

The toaster control mechanism of the present invention also serves to compensate for errors caused by self-heating of senser 27. This phenomenon of self-heating is discussed in the aforementioned copending application and stems from the fact that the senser increases its resistance whenever its temperature is increased. This increased resistance causes additional heating in the senser above that which would be proportional to the increase in current. In the toaster timing circuit, it has been found that self-heating is a desirable feature because it gives a strong cooling impetus to the senser at the end of the cycle. Moreover, it has been found that in order to achieve maximum sensitivity of the color adjusting means, the senser should be slightly hotter than the toast surface at the end of the cycle, which condition is attainable because of self-heating.

The self-heating phenomenon creates a problem with respect to voltage compensation in the timing circuit. If there were no self-heating in the senser, an increase in applied voltage would create approximately equal percentage current increases in responder 28 and compensator 29, and the compensator would be able to perform its ordinary voltage compensation function described above. However, since an increase in current in the senser causes an increase in its resistance due to self-heating, the responder, which is in parallel with the senser, will receive a disproportionate increase in current compared with the compensator. Thus, if the compensator only performed its ordinary voltage compensation function as described above, there would still be a shortening in the cycle time which would result in lighter toast.

To demonstrate more clearly the nature of this self-heating problem, a set of sample calculations is set forth showing the currents in the various elements when the applied voltage is 100 volts and when it is 120 volts. These calculations are based on test data collected from actual test models. It should be kept in mind that some of the values shown cannot be feasibly measured and are the result of several assumptions. With these calculations, the type and direction of the reactions caused by a voltage change can be obtained, even though the magnitudes of these reactions may be influenced to a minor extent by the assumptions.

In these calculations, the following controller parts are made of 80% nickel and 20% chromium wire:

Responder—0.020 diameter; approximately 0.4 ohms
Compensator—0.018 diameter; approximately 0.5 ohms
Shunt—0.025 diameter; approximately 0.565 ohms The purpose of shunt 31 in the circuit is to permit a smaller diameter wire to be used for the compensator. If the shunt were not present, a larger wire size would be needed for the compensator which would give it too much thermal lag and prevent the rapid response which is desired.

The above mentioned material has the following properties:

Temperature coefficient of expansion=$13.2 \times 10^{-6}$ per °C.
Good mechanical strength at elevated temperature.
Very low temperature coefficient of resistance between 600° F. and 900° F., considered to be zero for calculation purposes.

The senser is made of 70% nickel and 30% iron with a temperature coefficient of resistance of $45 \times 10^{-4}$ and diameter of 0.020.

Assumptions:
(1) The temperature of the controller compartment remains constant for calculation purposes.
(2) The resistance of the responder, compensator and shunt remain constant.

The following is a sample calculation for an applied voltage of 100 volts:

The total current through the controller=5 amps.
Therefore, current of responder plus senser=5 amps., and current of compensator plus shunt=5 amps.

At cycle initation:

Responder current=2.15 amps.
Responder equilibrium temperature for 2.15 amps=390° F.
Senser current=2.85 amps.
Senser equilibrium temperature for 2.85 amps=approximately 80° F.
Compensator current=2.65 amps.
Compensator equilibrium temperature for 2.65 amps=670° F.
Shunt current=5−2.65=2.35 amps.

At cycle termination for a toast color "A":

The senser, due to the surface temperature of the bread plus self-heating, has reached 400° F. which corresponds to a senser resistance of 6 ohms.
Senser current=2 amps.
Responder current=5 amps−2 amps=3 amps, corresponding to a responder temperature of 650° F.

Compensator and shunt currents and temperature remain constant.

The following is a sample calculation for a voltage of 120 volts:

The total current through the controller=6 amps which represents a 20% increase.

Therefore, current of responder plus senser=6 amps and current of compensator plus shunt=6 amps.

At cycle initiation:

Responder current=2.57 amps.
Responder equilibrium temperature for 2.57 amps= 517° F.
Senser current=6 amps−2.57 amps=3.43 amps.
Senser equilibrium temperature for 3.43 amps=90° F.
Compensator=3.18 amps.
Compensator equilibrium temperature for 3.18 amps= 887° F.
Shunt current=6.0 amps−3.18 amps=2.82 amps.

At cycle termination for toast color "A":

The senser, due to the surface temperature of the bread plus the self-heating, has reached a temperature of 421° F. with a 2.28 amp flow.
The responder current is 6.0−2.28=3.72 amps which corresponds to 867° F.
The compensator and shunt currents and temperatures have remained constant throughout the entire cycle.
Thus, the compensator temperature=887° F.

*Data summary*

|  | Responder | Senser | Compensator | Shunt |
|---|---|---|---|---|
| 100 v. Cycle Initiation: | | | | |
| Current | 2.15 | 2.85 | 2.65 | 2.35 |
| Temp., °F | 390 | 80 | 670 | -------- |
| 120 v. Cycle Initiation: | | | | |
| Current | 2.57 | 3.43 | 3.18 | 2.82 |
| Temp., °F | 517 | 95 | 887 | -------- |
| 100 v. Cycle Termination: | | | | |
| Current | 3.00 | 2.00 | 2.65 | 2.35 |
| Temp., °F | 650 | 400 | 670 | -------- |
| 120 v. Cycle Termination: | | | | |
| Current | 3.72 | 2.28 | 3.18 | 2.82 |
| Temp., °F | 867 | 421 | 887 | -------- |

From the above data, it will be seen that for a 20% increase in voltage, the compensator and shunt currents increase 20% at cycle termination whereas the responder current increases 24%. The additional 4% increase is caused by the self-heating of senser 27.

The means used to compensate for this additional 4% increase in the responder current is to adjust the dimensions of the parts so that the compensator will be 20° F. above the temperature of the responder at the termination of the cycle for toast color "A." Therefore, a 20% increase in the compensator current at cycle termination will cause the same temperature increase as a 24% increase in the responder current.

Stated another way, to attain perfect voltage compensation a voltage change must result in equal increases in temperature in the responder and compensator when the compensator receives an $x\%$ increase in current and the responder receives an $(x+y)\%$ increase in current, $y$ being the increase caused by self-heating of the senser. This is accomplished by choosing the temperature of the compensator as $$\frac{y}{x}$$

higher than the responder temperature at the point of contact opening. In other words, the temperature of the compensator is equal to $$\left(1+\frac{y}{x}\right)$$

times the temperature of the responder at cycle termination. The following equation will hold to give equal temperature increases in the responder and compensator:

$(x+y)$ percent temp. of compensator $$=x\%\left(1+\frac{y}{x}\right) \text{ temp. of responder}$$

Assuming $x$ equals 10% and $y$ equals 1%, a 10% increase in the voltage causes a 10% increase in the compensator current and $(x+y)=11\%$ increase in the responder current at cycle termination. To maintain a similar change in current in the responder and compensator, the temperature of the compensator must be $$\left(\frac{y}{x}\right)=10\%$$

higher than the responder.

It will be noted that this arrangement for self-heating voltage compensation is theoretically perfect only at a single toast color. However, in the normal range of toast colors, the resistance values chosen for a medium color will give sufficient compensation for dark and light colors to make any uncorrected errors negligible.

PREVENTION OF RECYCLING

As discussed above, responder 28 and compensator 29 are so arranged that unwanted recycling is prevented at the end of the cycle. By recycling is meant any factor which could induce control switch 34 to successively open and close just prior to cycle termination. Recycling is prevented by having compensator 29 at a higher temperature than responder 28 at cycle termination and by using a smaller wire diameter for the compensator. The instant switch 34 starts to open at the end of the cycle, relay wire 33 is thrown into the circuit. The resistance of this relay wire causes the current through the circuit to decrease slightly. Compensator 29, being at a higher temperature and having a smaller diameter than responder 28, will respond to the current decrease more rapidly than the responder and will shorten its length, causing the contacts to break cleanly. When relay switch 37 opens, motor 36 is placed in the circuit, and once again a current decrease takes place causing the contacts of switch 34 to open still further. Between the time switch 34 initially opens and the time main switch 39 opens, heaters 23—26 are energized, thus helping to open switch 34 still further due to the normal action of the senser-responder circuit.

It should be noted that the variation in wire size between responder 28 and compensator 29 is not used to aid voltage compensation, but to obtain the desired rates of response. It should also be observed that this wire size differential also contributes to rapid closure of control switch 34 at the initiation of a cycle. This rapid closure is essential in order to shunt relay wire 33 until the cycle is terminated. The smaller wire size of compensator 29 causes it to respond more rapidly than responder 28, thus increasing its length sufficiently to close switch 34. The fact that at initiation of the cycle the compensator has a higher equilibrium temperature than the responder also contributes to rapid initial closure of switch 34.

Figure 5:
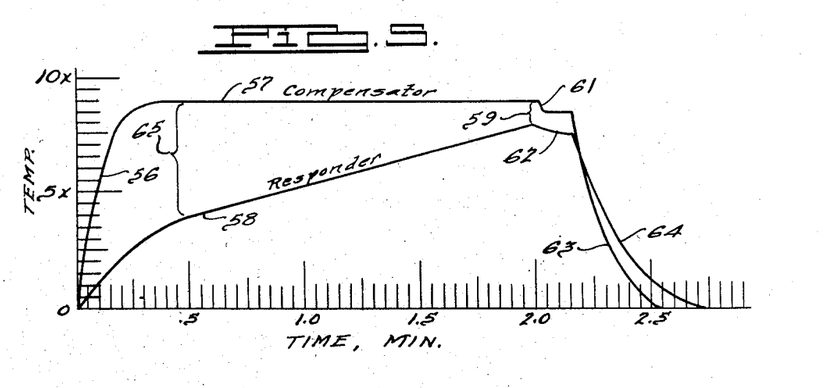
Figure 5 is a chart showing the variation of temperature with time of the responder and compensator during a complete toasting cycle with no changes in the applied voltage, this chart demonstrating the manner in which termination of the cycle is achieved and recycling is prevented.
Figure 6:
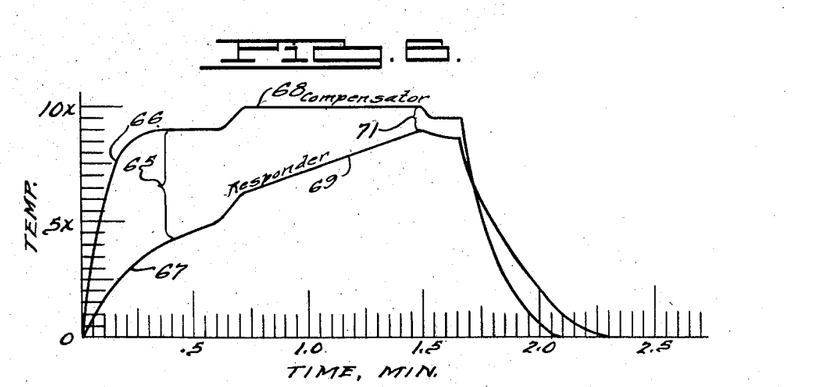
Figure 6 is a chart similar to Figure 5 but showing the effect of an increase in the applied voltage during the toasting cycle.
Figure 7:
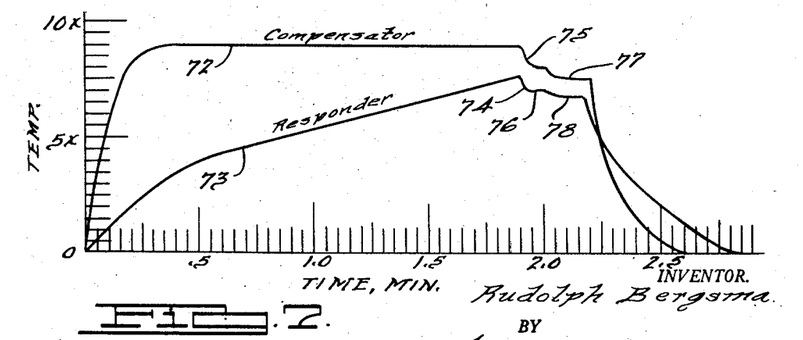
Figure 7 is a chart similar to Figures 5 and 6 but showing the effect of a voltage decrease just prior to cycle termination.

The actual temperature fluctuations of responder 28 and compensator 29 are shown in Figures 5, 6 and 7. Referring to Figure 5, a cycle is shown during which there are no changes in the applied voltage. At zero time both the responder and compensator are at the same temperature. Temperatures are indicated as multiples of $x$, the symbol $x$ representing the temperature differential at which the contacts of switch 34 are at the margin of opening and closing. For example, $x$ may equal 20° F. in a suitable embodiment, as discussed in the above calculations. When the voltage is applied the compensator rapidly reaches its equilibrium temperature, as shown by portion 56 of the compensator temperature line. The compensator remains at this equilibrium level throughout the entire toasting period, as shown by portion 57 of the compensator line. Responder 28 increases in temperature as shown by line 58. Since the initial temperature differential after the beginning of the cycle is substantially greater than $x$, the contacts of switch 34 are closed.

When the temperature of responder 28 reaches the point where the compensator is only $x°$ higher, as shown by bracketed space 59, switch 34 will open as described above. In a typical example this might occur two minutes after initiation of the cycle. The temperature of both responder 28 and compensator 29 will then be reduced. As indicated by portion 61 of the compensator line, the latter will respond more rapidly to the increased resistance in the circuit than will responder 28, represented by line 62. The distance between the lines will thus be even further reduced, keeping the contacts open during the time relay wire 33 and motor 36 are in the circuit. Main switch 39 will be opened, reducing the responder and compensator to their initial temperatures. In a typical example this may take place about seven seconds after control switch 34 is opened. A comparison of portion 63 of the compensator line with portion 64 of the responder line shows that the compensator is reduced in temperature more rapidly than the responder, keeping switch 34 open.

Figure 6 shows the temperature variations of the responder and compensator when the voltage is increased during the toasting cycle. Generally speaking, a voltage increase will shorten the total time cycle, and will also increase the cutoff temperatures of the responder and compensator. However, the temperature differential between the responder and compensator at the point in the cycle where the compensator reaches its equilibrium temperature will remain substantially constant for any given toast color within the voltage range of 95 to 125 volts. This temperature differential is represented by the bracket space 65 in Figures 5 and 6.

In Figure 6 the initial portions 66 and 67 of the compensator and responder lines respectively are approximately the same as in Figure 5. At about 0.6 minute an increase in applied voltage takes place. The compensator rapidly assumes a higher equilibrium temperature as indicated by portion 68 of the compensator line. The responder also receives an increase in temperature shown by portion 69 of the responder line. The rate of increase in temperature of the responder is thereafter more rapid and it will approach the compensator temperature at a faster rate. In the example shown this occurs 1.5 minutes after initiation of the cycle, at which time the temperature differential has reached the "$x$" quantity as indicated by bracket space 71. Switch 34 will be opened and the compensator and responder will be reduced in temperature in the same manner described with respect to Figure 5.

It should be noted that although the toasting time is shortened with the higher voltage, this will not mean that the toast will receive a lighter color than would be the case in the example of Figure 5. The shortened time of toasting is due to the fact that more heat is being applied to the toast surfaces. The compensator functions in the manner described previously to prevent further shortening of the cycle which would result from the voltage increase and the senser self-heating effect. The temperature differential $x$ at which control switch 34 is opened is held constant by the fact that the termination temperature of the compensator is higher than the termination temperature of the responder.

It should also be observed that in the examples shown in Figures 5 and 6 a sharp termination of the cycle is obtained because of the fact that the slope of the responder line is not reduced as it approaches it termination temperature. If the arrangement were such that the responder temperature tended to level off as it approached the temperature at which the cycle were terminated, there would not be a clearly defined point at which this temperature were reached. The arrangement therefore insures a clean break of the switch contacts and uniform toasting results.

Figure 7 shows another toasting cycle during which the applied voltage is suddenly decreased just prior to termination of the cycle. In this instance, the portions 72 and 73 of the compensator and responder lines respectively are the same as those shown in Figure 5. About 1.9 minutes after the cycle was started the voltage was suddenly decreased. At that time, the temperature differential was still higher than $x$. Portion 74 of the responder line shows that it decreased in temperature at about the same rate as the compensator, shown at 75. The temperature differentials therefore still remained greater than $x$ and the contacts remained closed. Since the responder had not yet reached its equilibrium temperature it continued to rise as shown by portion 76 of its line. At two minutes the temperature differential was reduced to $x$ and switch 34 was opened. The compensator was then reduced in temperature more rapidly than the responder, as shown by portion 77 and 78 of lines, and the contacts remained open. Upon opening of main switch 39 the elements reacted as in the example of Figure 5. A large voltage drop within several seconds of the cycle termination could cause a premature cycle termination. However, this would not be noticeable in the color of the bread because the major portion of the toasting cycle would have been completed. Small voltage drops would also be negligible.

Figures 8–12 show a preferred embodiment of the controller installed in an automatic toaster. The toaster shown, apart from the controller, does not form part of the present invention, but is described for purposes of understanding the invention and the cooperation of the controller with the other parts of the toaster. The particular toaster shown is adapted to lower and raise the toast automatically without requiring any manual manipulation other than dropping the toast onto the toast carriage. The toaster comprises a base 79 and frame 81 of inverted U-shape as shown in Figure 8. The toaster control mechanism is indicated generally at 82 and is secured to one side of frame 81 by bolts 83. Frame 81 also supports the four heating elements 23, 24, 25 and 26 as shown in Figure 9. Toast guard wires 84, 85, 86 and 87 are provided between the heating elements to form chambers 88 and 89 for two slices of toast. Senser 27 is disposed within chamber 88 so as to be in adjacent relation with a slice of bread, being sensitive to the surface temperature thereof.

The bread carriage mechanism comprises a pair of parallel links 91 and 92 pivotally connected at 93 and 94 respectively to one end of frame 81. The opposite ends of these links extend outwardly of frame 81 and are pivotally secured to a carriage support member 95. The pivotal connections are such that swinging movement of links 91 and 92 about their respective pivots will result in vertical translatory movement of member 95, the links remaining parallel. A bread carriage 96 is supported by member 95 through a pivotal connection 97 to the lower end of this member. Carriage 96 is normally held in an angular position as shown in solid lines in Figure 8 by a tension spring 98 connected between portion 99 of the carriage and the lower end of member 95. When a slice of bread is inserted and rests on carriage 96 the latter is swung to a position as shown in dot-dash lines in Figure 8 in which it is parallel to base 79.

An actuating arm 101 extends upwardly from carriage 96 and is adapted to engage a slidable rod 102 carried by member 95 and link 92. One end 103 of rod 102 extends outwardly from the toaster frame adjacent actuating arm 101. The other arm of rod 102 carries a button 104 which is adapted to engage a cam 105. This cam comprises an elongated member with an interior opening 106 and is pivoted at 107 to a manual release lever 108. Lever 108 is pivotally supported at 109 by frame 81 and extends from the opposite side of the frame, a handle 111 being secured to the outwardly extending end of the lever.

Lever 108 is supported in the position shown in Figure 8 by the thermal motor generally indicated at 36. This motor comprises a pair of upper leaf springs 112 and 113 and a lower leaf spring 114 which are connected by a pair of end blocks 115 and 116. A plurality of expansible wires 117 are secured at their opposite ends to blocks 115 and 116 and restrain these blocks from separation as urged by springs 112—114. Surmounting spring 112 is a leaf spring 118 of inverted V-shape which is slidably supported at its lower ends by a plate 119 secured to the central portions of springs 113 by a block 121. The central portion of spring 118 is engageable with the underside of lever 108. With the motor in its cold position lever 108 is thus supported in the position shown in Figure 8. When wires 117 are heated springs 112—114 are allowed to expand, lowering spring 118 and permitting lever 108 to drop.

Cam 105 acts to support links 91 and 92, as well as attached carriage 96, in the non-toasting position. A shoulder 122 is provided in the interior aperture 106 of cam 105, this shoulder engaging a pin 123 secured to link 92. When cam 105 is swung to the right as shown in Figure 8, links 91 and 92, as well as carriage 96, are allowed to drop to the toasting position. An arm 124 carrying a pin 125 and supported by a leaf spring 126 is engaged by cam 105 when swung to the right, and serves to close switch 39 (not shown in Figure 8).

In operation, the cycle is initiated by dropping a bread slice onto carriage 96. Actuating arm 101 will be swung to the right in Figure 8, sliding rod 102 to the right. Button 104 will engage cam 105, swinging it to the right and disengaging shoulder 122 from pin 123. The carriage will thus be allowed to drop into its toasting position. At the same time, arm 124 carrying pin 125 is engaged by cam 105 and serves to close main switch 39. The timing circuit will then operate as described above with respect to Figure 1. Upon opening of switch 34 relay wire 33 (not shown in Figure 8) will expand to open relay switch 37 (also not shown in Figure 8). Wires 117 of motor 36 will be energized and on expanding, lever 108 will drop with cam 105. When shoulder 122 has passed pin 123 cam 105 will be urged to the left by leaf spring 126 which supports arm 124. This will serve to open main switch 39. Wires 117 will rapidly cool, causing contraction of springs 112—114 and lifting of lever 108. Since pin 123 rests on shoulder 122 the bread carriage will also be lifted into non-toasting position.

Figure 10:
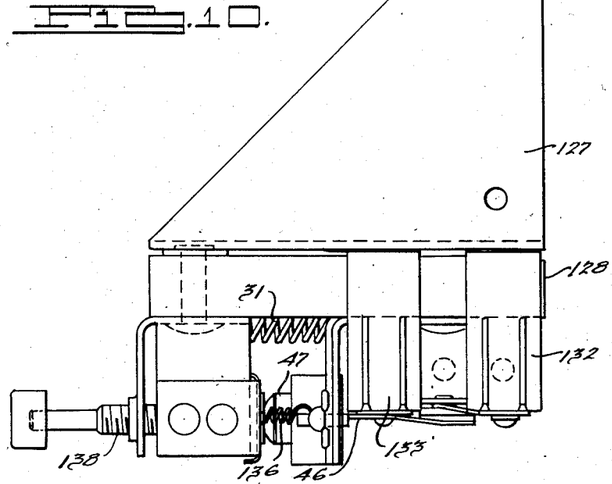
Figure 10 is an elevational view of the toaster control mechanism from the side opposite that shown in Figure 8, showing the means for mounting the various parts.
Figure 11:
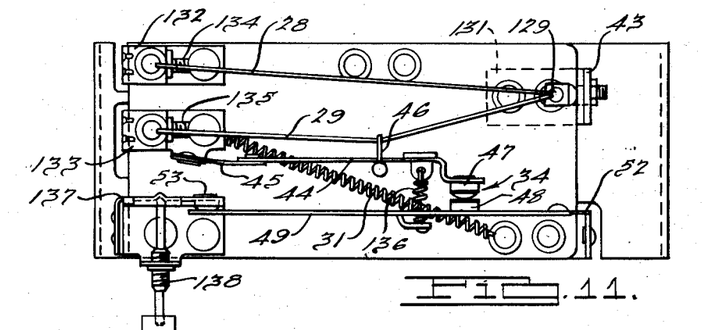
Figure 11 is a bottom plan view of the controller showing the manner in which the responder and compensator are connected to the switch contacts.
Figure 12:
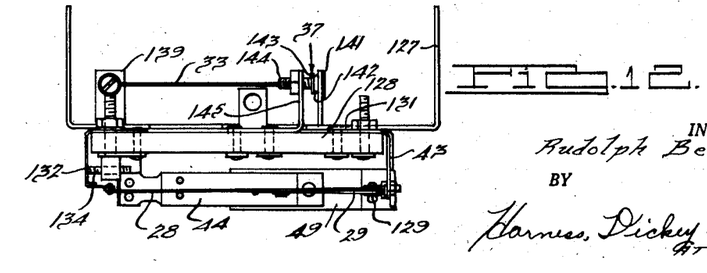
Figure 12 is an end elevational view looking from the right of Figure 10 and showing the relay wire mounting means.

The details of the toaster control mechanism 82 are shown in Figures 10–12. The mechanism comprises a U-shaped bracket 127 which supports the control elements and is secured to frame 81. The main portions of the controller are suspended below bracket 127 and are mounted on a ceramic slab or block 128. As shown best in Figure 11, responder 28 and compensator 29 are secured at one end to leaf spring 43 by means of a post 129. Leaf spring 43 is of a cantilever type having a base portion 131 secured to ceramic block 128. The opposite ends of responder 28 and compensator 29 are secured separately to spaced-apart adjustably fixed points. In particular, responder 28 is secured to a leaf spring 132 while compensator 29 is secured to a leaf spring 133, these springs being secured to block 128. Adjustable stops 134 and 135 prevent movement of leaf springs 132 and 133 respectively in the direction of tension of the responder and compensator.

Control switch 34 is mounted adjacent the responder and compensator and comprises lead contact arm 44 carrying contact 47 and following contact arm 49 carrying contact 48. Arm 44 is supported by leaf spring 45 and arm 49 by leaf spring 52, these springs being carried by block 128. A tension spring 136 is secured between arms 44 and 49 and tends to urge them toward each other. Hook 46 engages compensator 29 and restrains the movement of arm 44 in accordance with the slack in the compensator. Color control stop 53 is carried by a leaf spring 137 secured to block 128. A control screw 138 is mounted adjacent stop 53 and serves to adjust the position of this stop with respect to the outer end of arm 49. Block 128 and bracket 127 also serve to support shunt 31 and relay wire 33, as shown in Figures 11 and 12. In particular, relay wire 33 is supported by block 128, being secured at one end to a post 139. The opposite end of relay wire 33 is connected to relay switch 37, being secured to a leaf spring 141 carrying a contact 142 of this switch. One end of leaf spring 141 is shown in Figure 12, the leaf spring extending transversely to the paper in this view. The other contact 143 of switch 37 is supported by an adjusting screw 144 held by a post 145.

The electrical connections between these elements are not fully shown in Figures 10–12 but are believed obvious from the previous views. The operation of the controller as shown in Figures 10–12 is identical with that of the schematic views, and is not repeated here. It should be noted however that the controller is extremely compact in design and does not interfere in any way with the other parts of the toaster. It should also be kept in mind that the controller may be used without relay wire 33 to control motor 36 directly if desired.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a control mechanism for a toaster, a toaster heating element, a supply circuit for said heating element, a control switch for said supply circuit, a senser comprising an element having a high temperature coefficient of resistance, said senser being in said supply circuit and positioned so as to be responsive to the surface temperature of a bread slice, a responder in parallel with said senser, a compensator in series with said senser and responder, said responder and compensator comprising a pair of wires having low temperature coefficients of resistance and predetermined temperature coefficients of expansion, said wires being disposed alongside each other, means fixedly supporting adjacent ends of said wires, a common support for the opposite ends of said wires, means urging said common support in a direction tending to elongate said wires, and means connecting said control switch to one of said wires whereby the amount of slack in said one wire controls the opening and closing of said switch.

2. The combination according to claim 1, further provided with a shunt in parallel with said compensator, said shunt serving to reduce the amount of current flowing through said compensator during a toasting cycle.

3. The combination according to claim 1, said control switch being connected to said compensator wire, the compensator wire being of smaller diameter than said responder wire, and a shunt in parallel with said compensator wire to reduce the amount of current carried thereby.

4. In a control mechanism for a toaster, a toaster heating element, a supply circuit for said heating element, a control switch for said supply circuit, a senser comprising an element having a high temperature coefficient of resistance, said senser being in said supply circuit and positioned so as to be responsive to the surface temperature of a bread slice, a responder in parallel with said senser, a compensator in circuit with said senser and responder, said responder and compensator comprising a pair of wires having low temperature coefficients of resistance and predetermined temperature coefficients of expansion, said wires being disposed alongside each other, and means responsive to the differential expansion of said wires to actuate said control switch.

5. In a control mechanism for a toaster, a toaster heating element, a supply circuit for said heating element, a control switch for said supply circuit, a sensor comprising an element having a high temperature coefficient of resistance, said senser being in said supply circuit and positioned so as to be responsive to the surface temperature of a bread slice, a responder in parallel with said senser, a compensator in series with said senser and responder, said responder and compensator comprising a pair of wires having low temperature coefficients of resistance and predetermined temperature coefficients of expansion, said wires being disposed alongside each other, means fixedly supporting adjacent ends of said wires, a common support for the opposite ends of said wires, and means responsive to the differential expansion of said wires to actuate said control switch.

6. In a control mechanism for a toaster, a toaster heating element, a supply circuit for said heating element, a control switch for said supply circuit, a senser comprising an element having a high temperature coefficient of resistance, said senser being in said supply circuit and positioned so as to be responsive to the surface temperature of a bread slice, a responder in parallel with said senser, a compensator in circuit with said senser and responder, said responder and compensator comprising a pair of wires having low temperature coefficients of resistance and predetermined temperature coefficients of expansion, said wires being disposed alongside each other, the compensator wire being of smaller diameter than said responder wire, a shunt in parallel with said compensator wire to reduce the amount of current carried thereby, and means responsive to the differential expansion of said responder and compensator wires to actuate said control switch.

7. In a control mechanism, two wires disposed alongside each other, means fixedly supporting one pair of adjacent ends of said wires, a common support for the opposite pair of adjacent ends of said wires, means urging said common support in a direction tending to lengthen said wires, one of said wires being freely supported between its ends, whereby said one wire is always straight and taut, a switch comprising a pair of contacts, means urging said contacts toward each other, connecting means between one of said contacts and the other of said wires, said connecting means being so arranged that slackening of said other wire permits movement of said one contact toward said other contact and straightening of said other wire draws said one contact away from said other contact, a stop limiting the movement of said other contact toward said first contact, and means for varying the relative temperatures in said wires to control the opening and closing of said contacts.

8. In a control mechanism, a pair of wires alongside each other, means fixedly supporting adjacent ends of said wires, a common support for the opposite ends of said wires, means urging said common support in a direction tending to lengthen said wires, one of said wires being of smaller diameter than the other wire whereby it attains an equilibrium temperature and length more quickly than said other wire when subjected to a change in current, one of said wires being straight, the other wire having slack, the force of said urging means being constantly aligned with said straight wire, a control element, means connecting the slack wire to said control element so that the amount of slack governs the position of said control element, and means for simultaneously applying a voltage across both of said wires, whereby the relative lengths of said wires is varied to move said control element.

9. In a control mechanism, a pair of wires along-side each other, means fixedly supporting adjacent ends of said wires, a common support for the opposite ends of said wires, means urging said common support in a direction tending to lengthen said wires, one of said wires being straight, the other wire having slack, the force of said urging means being constantly aligned with said straight wire, said slack wire being of substantially smaller diameter than the straight wire whereby it attains an equilibrium temperature and length more quickly than the straight wire when subjected to a change in current, a switch, means connecting one contact of said switch with said slack wire, whereby the slack governs the position of said switch, the switch being in one position when said slack wire has more than a predetermined slack and in a second position when said slack wire has less than said predetermined slack, means for applying current to said slack wire to increase its slack beyond said predetermined amount, and condition-responsive means for increasing the current in said straight wire whereby the slack in said slack wire is reduced below said predetermined amount.

10. The combination according to claim 9, said condition-responsive means comprising an element in circuit with said wires and having a positive temperature coefficient of resistance, the connecting means between said switch and said slack wire being of such dimensions that said switch is at the margin between its two positions when the temperature of said straight wire is a predetermined amount below the temperature of said slack wire, said switch being in one position when the temperature of said straight wire is higher than said predetermined amount and being in its other position when the temperature of said straight wire is less than said predetermined amount.

11. A control mechanism comprising two wires, means fixedly supporting one pair of adjacent ends of said wires, means exerting tension on the opposite pair of adjacent ends of said wires, one of said wires being freely supported between its ends whereby said one wire is always straight and taut, said tension force being constantly aligned with said straight wire, a switch having a pair of contacts, means connecting one of said contacts to an intermediate portion of the other of said wires whereby the length of said one wire and the amount of slack in said other wire determine the position of said one contact with respect to the other contact, said two wires having substantially different time rates of length change in response to changes applied current, and means for applying current simultaneously to said wires.

12. In a control mechanism for a heating circuit, a heating element, a supply circuit for said heating element, a control switch for said supply circuit, said switch having a pair of contacts, a control circuit for controlling the position of said switch, two wires in said control circuit disposed alongside each other, means fixedly supporting one pair of adjacent ends of said wires, a common support for the opposite pair of adjacent ends of said wire, means urging said common support in a direction tending to lengthen said wires, one of said wires being freely supported between its ends whereby said one wire is always straight and taut, the force of said urging means being constantly aligned with said straight wire, means connecting one of said switch contacts to an intermediate portion of the other of said wires, whereby the length of said one wire and the slack in said other wire control the relative positions of said contacts, means for simultaneously applying a current to both of said wires, and means responsive to the heat produced by said heating element for varying the relative currents in said wires, whereby the slack of said other wire is varied.

13. In a control mechanism, two wires disposed alongside each other, means fixedly supporting one pair of adjacent ends of said wires, a common support for the opposite pair of adjacent ends of said wires, means urging said common support in a direction tending to lengthen said wires, one of said wires being adapted to attain an equilibrium temperature and length more quickly than the other wire when both are subjected to a change in current, a switch having a movable contact connected to an intermediate portion of said one wire, a spring urging said movable contact toward the other contact of said switch and serving to tauten said one wire, the switch being movable between open and closed positions and being normally in one position when no current is flowing in said wires, means for applying a current to said one wire whereby said switch will move to its other position, condition-responsive means for increasing the relative current in said other wire whereby said switch will move to its first position, and means responsive to movement of said switch to its first position for reducing the current in both wires, the quicker response of said one wire thereby maintaining said switch in its first position and preventing recycling.

References Cited in the file of this patent

UNITED STATES PATENTS

| | | |
|---|---|---|
| 952,778 | Wohl et al. | Mar. 22, 1910 |
| 1,214,101 | Wessel | Jan. 30, 1917 |
| 1,255,713 | Creveling | Feb. 5, 1918 |
| 2,030,932 | Persons | Feb. 18, 1936 |
| 2,394,885 | Baak | Feb. 12, 1946 |
| 2,441,979 | Schmidinger et al. | May 25, 1948 |
| 2,570,453 | Huck | Oct. 9, 1951 |
| 2,598,808 | Ledin | June 3, 1952 |
| 2,615,386 | Palmer | Oct. 28, 1952 |
| 2,655,860 | Smith | Oct. 20, 1953 |
| 2,667,828 | Koci | Feb. 2, 1954 |
| 2,750,873 | Sivacek | June 19, 1956 |

FOREIGN PATENTS

| | | |
|---|---|---|
| 496,460 | France | Aug. 4, 1919 |